(12) United States Patent
Takai et al.

(10) Patent No.: US 11,584,017 B2
(45) Date of Patent: Feb. 21, 2023

(54) CONVEYANCE SYSTEM, TRAINED MODEL GENERATION METHOD, TRAINED MODEL, CONTROL METHOD, AND PROGRAM

(71) Applicant: TOYOTA JIDOSHA KABUSHIKI KAISHA, Toyota (JP)

(72) Inventors: Tomohisa Takai, Nagoya (JP); Yuhei Yamaguchi, Toyota (JP); Satoshi Toyoshima, Okazaki (JP); Yuta Watanabe, Toyota (JP); Tetsuya Taira, Nagakute (JP); Mikio Honda, Toyota (JP); Shiro Oda, Anjo (JP); Nobuhisa Otsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 17/097,476

(22) Filed: Nov. 13, 2020

(65) Prior Publication Data

US 2021/0154856 A1 May 27, 2021

(30) Foreign Application Priority Data

Nov. 25, 2019 (JP) .............................. JP2019-212381

(51) Int. Cl.
*B25J 9/16* (2006.01)
*B25J 13/08* (2006.01)
*B25J 11/00* (2006.01)

(52) U.S. Cl.
CPC ............ *B25J 9/1697* (2013.01); *B25J 9/163* (2013.01); *B25J 9/1651* (2013.01); *B25J 9/1664* (2013.01);
(Continued)

(58) Field of Classification Search
CPC ........ B25J 9/1697; B25J 9/163; B25J 9/1651; B25J 9/1664; B25J 9/1679; B25J 11/008;
(Continued)

(56) References Cited

U.S. PATENT DOCUMENTS

| 4,162,869 A | 7/1979 | Hitomi et al. |
| 9,026,301 B2 | 5/2015 | Zini et al. |

(Continued)

FOREIGN PATENT DOCUMENTS

| JP | S60-262787 A | 12/1985 |
| JP | S62-222309 A | 9/1987 |

(Continued)

OTHER PUBLICATIONS

Sep. 14, 2022 Office Action issued in U.S. Appl. No. 17/097,061.

*Primary Examiner* — Nicholas Kiswanto
*Assistant Examiner* — Dylan Brandon Mooney
(74) *Attorney, Agent, or Firm* — Oliff PLC

(57) ABSTRACT

The present disclosure provides a conveyance system and the like capable of preferably conveying a conveyed object in accordance with a state of the conveyed object. The conveyance system includes a conveyance robot, a drive controller, which is a controller, an image data acquisition unit, and a setting unit. The conveyance robot conveys the conveyed object. The drive controller controls an operation of the conveyance robot. The image data acquisition unit acquires image data obtained by capturing images of the conveyed object. The setting unit sets an operation parameter of the conveyance robot in the drive controller based on the acquired image data.

9 Claims, 14 Drawing Sheets

(52) U.S. Cl.
CPC ........... *B25J 9/1679* (2013.01); *B25J 11/008* (2013.01); *B25J 13/088* (2013.01)

(58) Field of Classification Search
CPC ............... B25J 13/088; B62B 2202/90; B62B 2203/10; B62B 3/0612; B62B 5/0069; B62B 5/0076; B62B 5/0079; G05B 2219/40411; G05D 1/0246; G05D 1/028; G05D 1/0285; G05D 2201/0206; G05D 1/0223; G05D 2201/0217; G06Q 10/0832; G06Q 10/083; A47B 2031/002; A47B 2031/004
See application file for complete search history.

(56) References Cited

U.S. PATENT DOCUMENTS

| | | | |
|---|---|---|---|
| 2007/0124024 A1 | 5/2007 | Okamoto et al. | |
| 2010/0174546 A1* | 7/2010 | Kim | B25J 13/003 704/275 |
| 2011/0106362 A1 | 5/2011 | Seitz | |
| 2014/0240117 A1 | 8/2014 | McKernan et al. | |
| 2016/0297429 A1 | 10/2016 | Watts | |
| 2018/0272535 A1* | 9/2018 | Ogawa | B25J 13/085 |
| 2018/0339701 A1 | 11/2018 | Kwon | |
| 2019/0138009 A1 | 5/2019 | Saito et al. | |
| 2019/0243374 A1* | 8/2019 | Ikawa | G05D 1/0274 |
| 2021/0233228 A1* | 7/2021 | Yamaguchi | G06T 1/0014 |
| 2022/0135384 A1* | 5/2022 | Takayama | G05D 1/0088 701/50 |

FOREIGN PATENT DOCUMENTS

| | | |
|---|---|---|
| JP | H2-265804 A | 10/1990 |
| JP | 2004-206393 A | 7/2004 |
| JP | 2008-127178 A | 6/2008 |
| JP | 2009-123045 A | 6/2009 |
| JP | 2019-018265 A | 2/2019 |
| JP | 2019-087073 A | 6/2019 |
| WO | 2006/013829 A1 | 2/2006 |

* cited by examiner

T10

| CONVEYED OBJECT | STATE OF CONVEYED OBJECT | | CLASSIFICATION | OPERATION PARAMETER | | |
|---|---|---|---|---|---|---|
| | | | | RAISING/LOWERING DRIVE UNIT | | MOVEMENT DRIVE UNIT |
| CLEARING TRAY | AMOUNT OF LEFTOVER FOOD IS SMALL | OBJECTS IN TRAY ARE NEATLY PLACED | STABLE | PARAMETER SET A | ACCELERATION MODE D1 | ACCELERATION MODE F1 |
| | AMOUNT OF LEFTOVER FOOD IS LARGE | OBJECTS IN TRAY ARE SCATTERING | UNSTABLE | PARAMETER SET B | ACCELERATION MODE D2 | ACCELERATION MODE F2 |

Fig. 7

CONVEYANCE SYSTEM, TRAINED MODEL GENERATION METHOD, TRAINED MODEL, CONTROL METHOD, AND PROGRAM

CROSS REFERENCE TO RELATED APPLICATIONS

This application is based upon and claims the benefit of priority from Japanese patent application No. 2019-212381, filed on Nov. 25, 2019, the disclosure of which is incorporated herein in its entirety by reference.

BACKGROUND

The present disclosure relates to a conveyance system, a trained model generation method, a trained model, a control method, and a program.

The development of autonomous moving apparatuses that autonomously move in certain buildings and facilities has been advancing. By equipping such an autonomous moving apparatus with a parcel carrier or towing a cart, it can be used as an automatic delivery apparatus that automatically delivers parcels. The automatic delivery apparatus can deliver, for example, a parcel loaded at a starting place to a destination by autonomously traveling from the starting point to the destination.

For example, an automatic delivery apparatus disclosed in U.S. Pat. No. 9,026,301 includes an autonomously movable tractor part and a parcel carrier part. Further, a computer provided in them stores electronic maps of floor plans of buildings and routes that the automatic delivery apparatus follows when it moves from one place to the next place. The above-described automatic delivery apparatus conveys various objects by using parcel carrier parts of different types depending on the purpose.

SUMMARY

It is desired that a conveyance robot quickly convey a conveyed object. When the conveyed object is subjected to a vibration or an impact as a result of quickly conveying the conveyed object, however, it is possible that a problem such as collapse of the conveyed object may occur. Further, even when the kinds of conveyed objects are the same, if the state of the conveyed object is unstable, the above problem tends to occur easily. However, even when the centroid position of the conveyed object in the stationary state is detected, it is impossible to determine whether or not the conveyance state is stable.

The present disclosure has been made in order to solve the above-described problem and provides a conveyance system and the like capable of preferably conveying a conveyed object in accordance with the state of the conveyed object.

A conveyance system according to one aspect of the present disclosure includes a conveyance robot, a controller, an image data acquisition unit, and a setting unit. The conveyance robot conveys a conveyed object. The controller controls an operation of the conveyance robot. The image data acquisition unit acquires image data obtained by capturing images of the conveyed object. The setting unit sets an operation parameter of the conveyance robot in the controller based on the acquired image data.

Thus, the conveyance system sets the operation parameter in accordance with the acquired image data. It is therefore possible to preferably convey the conveyed object in accordance with the state of the conveyed object.

In the aforementioned conveyance system, a database may include a trained model that accepts the image data of the conveyed object as an input and outputs the operation parameter of the conveyance robot in accordance with the image data of the conveyed object that has been accepted, and the setting unit may input the image data of the conveyed object into the trained model and set the operation parameter, which is an output for the image data of the conveyed object that has been input, in the controller. Thus, the setting unit preferably sets the operation parameter of the conveyance robot from the input image data.

In the aforementioned conveyance system, the database may store each of reference image data of the conveyed object and the operation parameter that corresponds to the reference image data of the conveyed object in advance, and the setting unit may compare the image data of the conveyed object that has been newly acquired with the reference image data stored in the storage unit and set the operation parameter based on the result of the comparison. Thus, the setting unit sets the operation parameter that corresponds to the input image data.

The conveyance system may further include an image capturing unit configured to capture images of the conveyed object and a wagon that accommodates the conveyed object and is moved by the conveyance robot in a state in which the wagon accommodates the conveyed object, in which the setting unit may acquire the image data of the conveyed object obtained by capturing images by the image capturing unit when the conveyed object is accommodated in the wagon. Thus, the conveyance system is able to set the operation parameter by using the image data of the conveyed object accommodated in the wagon.

In the aforementioned conveyance system, the wagon may include a data acquisition trigger configured to detect that the wagon has accommodated the conveyed object, and the setting unit may acquire the image data of the conveyed object obtained by capturing images by the image capturing unit at a time back dated from the time when the data acquisition trigger has detected that the wagon has accommodated the conveyed object by a preset period. Thus, the conveyance system is able to easily acquire the image data of the conveyed object accommodated in the wagon.

In the aforementioned conveyance system, the conveyance robot may include a raising/lowering mechanism for raising and/or lowering the wagon, and the setting unit may set a raising/lowering acceleration of the raising/lowering mechanism as the operation parameter. Thus the conveyance system is able to raise and/or lower the wagon while preventing collapse of the conveyed object and the like.

In the aforementioned conveyance system, the setting unit may set at least one of a moving acceleration of the conveyance robot and a moving path along which the conveyance robot passes as the operation parameter. Thus the conveyance system is able to raise and/or lower the wagon while preventing collapse of the conveyed object and the like.

In the aforementioned conveyance system, the conveyance robot may include an object sensor configured to detect an object that is present in the vicinity of the conveyance robot, and the setting unit may set a range detected by the object sensor as the operation parameter. Accordingly, the conveyance system is able to prevent a situation in which an obstacle unexpectedly contacts the conveyance robot and to prevent collapse of the conveyed object and the like.

In the aforementioned conveyance system, the conveyance robot may include a notification apparatus that sends a notification indicating that the conveyance robot is conveying the conveyed object to an area in the vicinity of the conveyance robot, and the setting unit may set a notification level of the notification apparatus as the operation parameter. Accordingly, the conveyance system is able to prevent a situation in which an obstacle unexpectedly contacts the conveyance robot and to prevent collapse of the conveyed object and the like.

A trained model generation method according to one aspect of the present disclosure includes a training data acquiring step and a model generation step. The training data acquiring step acquires a plurality of pieces of training data, each of the pieces of training data including image data of a conveyed object and an operation parameter of a conveyance robot that corresponds to the image data of the conveyed object. The model generation step generates a trained model that accepts, using the training data, the image data of the conveyed object as an input and outputs the operation parameter of the conveyance robot in accordance with the image data of the conveyed object that has been accepted. Accordingly, it is possible to generate the trained model that outputs the operation parameter in accordance with the state of the conveyed object.

A trained model according to one aspect of the present disclosure is a trained model learned by acquiring a plurality of pieces of training data, each of the pieces of training data including image data of a conveyed object and an operation parameter of a conveyance robot that corresponds to the image data of the conveyed object. The aforementioned trained model causes a computer to execute processing of accepting the image data of the conveyed object as an input and outputting the operation parameter of the conveyance robot that conveys the conveyed object based on the image data of the conveyed object that has been accepted. Thus, the trained model outputs the operation parameter of the conveyance robot in accordance with the state of the conveyed object.

A control method according to one aspect of the present disclosure sets an operation parameter in a conveyance robot for conveying a conveyed object and includes a storing step, an image data acquiring step, a setting step, and a control step. The storing step stores a database for associating image data of the conveyed object with an operation parameter of the conveyance robot. The image data acquisition step acquires image data obtained by capturing images of the conveyed object. The setting step sets the operation parameter based on the image data of the conveyed object that has been acquired and the database. The control step controls the conveyance robot based on the set operation parameter.

Accordingly, the control method sets the operation parameter in accordance with the acquired image data. Thus, the conveyance system is able to preferably convey the conveyed object in accordance with the state of the conveyed object.

A program according to one aspect of the present disclosure causes a computer to execute a control method including a storing step, an image data acquiring step, a setting step, and a control step. The storing step stores a database for associating image data of the conveyed object with an operation parameter of the conveyance robot. The image data acquiring step acquires image data obtained by capturing images of the conveyed object. The setting step sets the operation parameter based on the image data of the conveyed object that has been acquired and the database. The control step controls the conveyance robot based on the set operation parameter.

Accordingly, the program sets the operation parameter in accordance with the acquired image data. Thus, the conveyance system is able to preferably convey the conveyed object in accordance with the state of the conveyed object.

According to the present disclosure, it is possible to provide a conveyance system and the like capable of preferably conveying the conveyed object in accordance with the state of the conveyed object.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 7 is a table showing an example of a relation between the state of a conveyed object and an operation parameter.

DESCRIPTION OF EMBODIMENTS

Hereinafter, the present disclosure will be explained through embodiments of the present disclosure. However, they are not intended to limit the scope of the present disclosure according to the claims. Further, all of the components/structures described in the embodiments are not necessarily indispensable as means for solving the problem. For clarifying the explanation, the following description and the drawings are partially omitted and simplified as appropriate. The same symbols are assigned to the same elements throughout the drawings and duplicated explanations are omitted as appropriate.

First Embodiment

Figure 1:
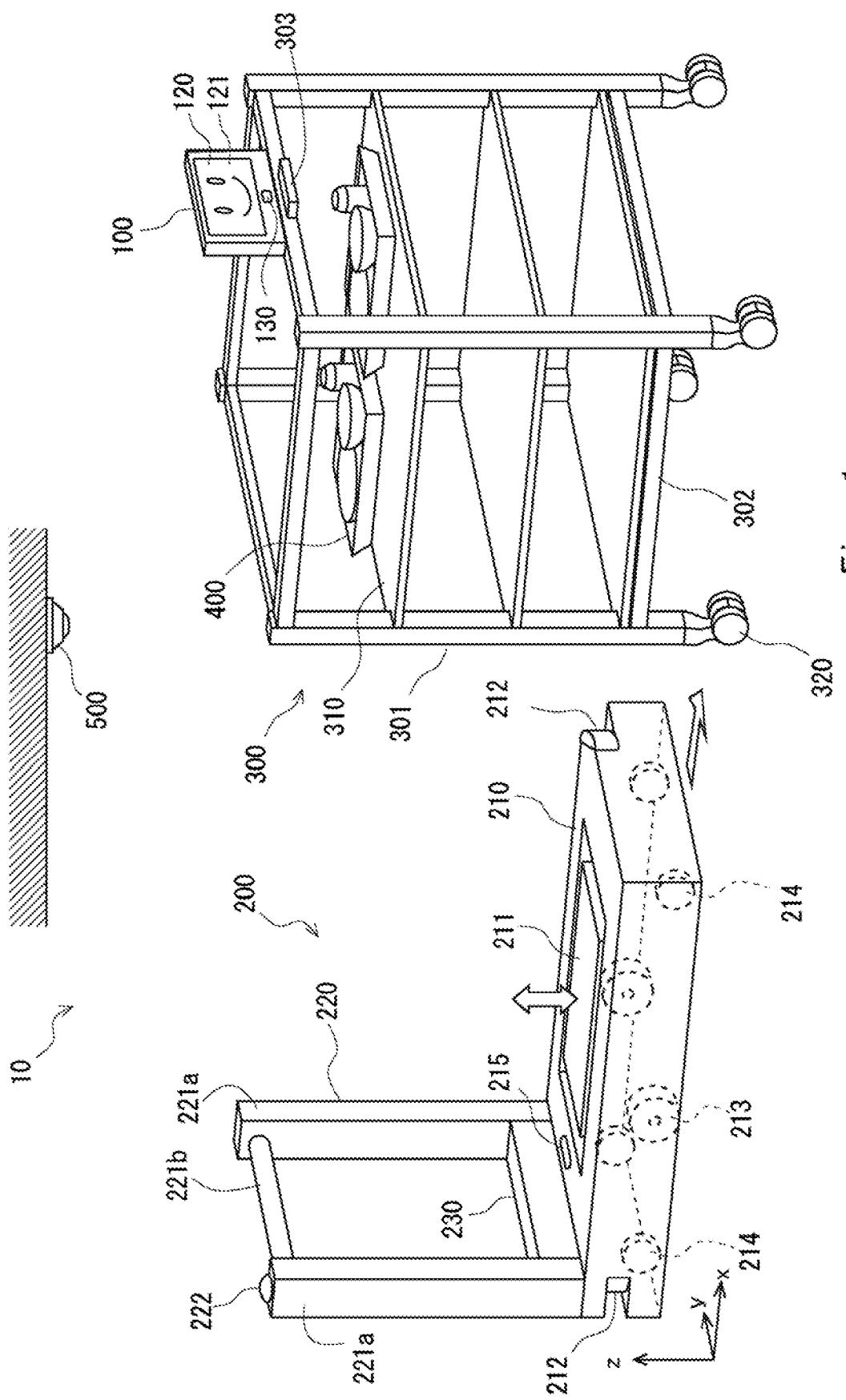
FIG. 1 is an overview diagram of a conveyance system according to a first embodiment.

Referring to FIG. 1, a conveyance system according to a first embodiment will be described. In the conveyance system, a conveyance robot that autonomously moves in a predetermined area conveys a wagon that accommodates conveyed objects. FIG. 1 is an overview diagram of the conveyance system according to the first embodiment. A conveyance system 10 shown in FIG. 1 is one embodiment of the conveyance system. The conveyance system 10 is able to convey, for example, meal for patients from a kitchen, dishes after patients have finished eating to the kitchen, or clothes, bed linen or the like to a predetermined place in a facility such as a hospital. The conveyance system 10 includes, as its main components, a conveyance robot 200, a wagon 300, and a camera 500.

Figure 2:
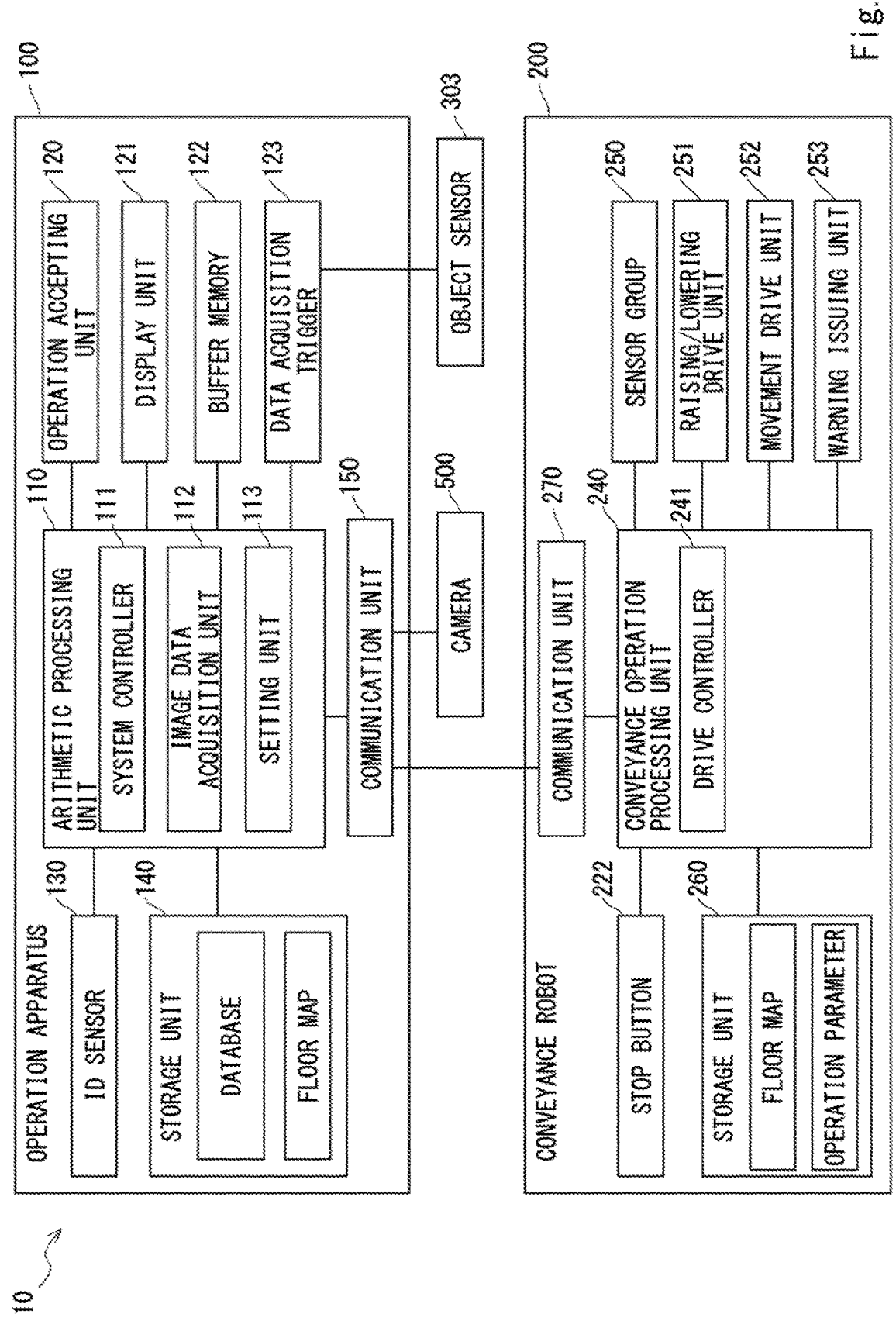
FIG. 2 is a block diagram of the conveyance system according to the first embodiment.

Note that in FIG. 1, a right-handed orthogonal coordinate system is shown for the sake of convenience for explaining a positional relation among components. Further, when an orthogonal coordinate system is shown in FIG. 2 and the following drawings, its X-, Y- and Z-axis directions coincide with the X-, Y- and Z-axis directions of the orthogonal coordinate system.

The conveyance robot 200 is an autonomous mobile robot that moves on the floor surface of the hospital. The conveyance robot 200 conveys the conveyed object accommodated in the wagon 300 from a predetermined position (starting point) to another position (destination). The conveyance robot 200 includes, as its main components, a main body block 210, a handle block 220, and a control block 230. In the following description, an operation in which the conveyance robot 200 moves from a predetermined place to the starting point, obtains the conveyed object, and conveys the conveyed object to the destination may be referred to as "recovering a conveyed object".

The main body block 210 has a flat rectangular parallelepiped shape whose principal surface contacts the ground. The height of the principal surface of the main body block 210 is set to one that allows the main body block 210 to enter underneath the wagon 300. Thus the main body block 210 enters underneath the wagon 300 and raises the wagon 300 from below. The main body block 210 includes, as its main components, a raising/lowering unit 211, a distance measurement sensor 212, driving wheels 213, trailing wheels 214, and a speaker 215.

The raising/lowering unit 211, which is a flat-shaped component provided at the center of the upper surface of the main body block 210, includes a substantially smooth contact surface on the upper side (z-axis positive side) thereof. The contact surface is provided in such a way that it becomes parallel to the floor surface (xy plane) and is directed upward. A raising/lowering mechanism (not shown) for raising and/or lowering the raising/lowering unit 211 is provided in the lower side of the raising/lowering unit 211. With the raising/lowering mechanism, the raising/lowering unit 211 is able to raise and lower the contact surface and stop at a predetermined position. Thus the raising/lowering unit 211 is configured to contact the lower part of the wagon 300, raise the wagon 300 in parallel to the floor surface, and hold the wagon 300.

The distance measurement sensor 212 is a sensor that detects the conveyance robot 200 and an object which is in the vicinity of the conveyance robot 200 and is able to measure the distance from the object that has been detected. The distance measurement sensor 212 detects the relative position between the conveyance robot 200 and the object which is in the vicinity of the conveyance robot 200 by, for example, infrared light, laser light, millimeter waves or the like. The distance measurement sensor 212 may be referred to as an object sensor. The distance measurement sensor 212 is provided in each of the front part and the rear part of the main body block 210. Thus the distance measurement sensor 212 is able to detect an obstacle when there is an obstacle in a desired movement direction of the conveyance robot 200.

The conveyance robot 200 sets a safe distance regarding the distance between the obstacle detected by the distance measurement sensor 212 and the conveyance robot 200. The conveyance robot 200 controls the autonomous movement of the conveyance robot 200 in such a way that the distance between the obstacle and the conveyance robot 200 becomes larger than the safe distance. Further, when the distance between the obstacle and the conveyance robot 200 has become smaller than the safe distance, the conveyance robot 200 temporarily stop s moving or issues a warning for an obstacle.

The driving wheels 213 contact the floor surface, support the main body block 210, and allow the main body block 210 to move. The main body block 210 includes two driving wheels 213 supported on one rotation axis extending in the right-left direction (y-axis direction) in such a way that they are separated from each other at the center of the conveyance robot 200 in the front-back direction (x-axis direction). The two driving wheels 213 are configured to be able to independently rotate about one rotation axis. The conveyance robot 200 moves forward or backward by driving the right and left driving wheels 213 at the same rotational speed and turns by driving the right and left driving wheels 213 at different rotational speeds or in different rotational directions.

The trailing wheels 214 contact the floor surface, support the main body block 210, and are freely rotated in accordance with the movement of the driving wheels 213. The main body block 210 includes the trailing wheels 214 in the front-back direction of the driving wheels 213. That is, the main body block 210 includes the trailing wheels 214 at four respective corners of the rectangular contact surface.

The speaker 215 is a component for emitting a set voice. The speaker 215 is provided in such a way that the emitted voice can be recognized by passersby, etc. who are present in the vicinity of the conveyance robot 200. Thus the conveyance robot 200 is able to issue a warning such as calling attention to the presence of the conveyance robot 200 to the passersby, etc. via the speaker 215.

The handle block 220 is used when the user manually tows the conveyance robot 200. The handle block 220 includes two columnar members 221a that stand in parallel to each other with an interval therebetween in the right-left direction on the upper surface of a rear end part of the main body block 210 and a grip part 221b that bridges the upper end parts of the two respective columnar members 221a. A stop button 222 is provided in an upper end part of one of the two columnar members 221a. When the stop button 222 is pressed down, the conveyance robot 200 stops its autonomous movement.

The control block 230 includes a Central Processing Unit (CPU), a circuit and the like for controlling the drive of the conveyance robot 200. The control block 230 is placed in a desired position of the conveyance robot 200 and controls the conveyance robot 200 in accordance with an instruction received from the operation apparatus 100. Further, the control block 230 transmits information acquired from the sensor or the like of the conveyance robot 200 to the operation apparatus 100 as appropriate.

The conveyance robot 200 includes a posture sensor. The posture sensor, which is a six-axis sensor that is fixed in a desired position of the conveyance robot 200 and detects accelerations in the respective axis directions of the three orthogonal axes and angular velocities around the respective axes, detects a change in the posture of the conveyance robot 200. When, for example, the conveyance robot 200 passes a slope, the posture sensor detects the inclination of the conveyance robot 200 in accordance with the inclination on the floor surface.

The wagon 300 is a conveyed object accommodation body that accommodates a plurality of conveyed objects 400. The wagon 300 forms a frame body having a quadrangular prism shape since a plurality of frames 301 are coupled, and includes casters 320 provided in the four respective corners of the bottom surface part of the wagon 300. The other main components of the wagon 300 are an operation apparatus 100, a bottom plate 302, an object sensor 303, and a shelf board 310.

The operation apparatus 100, which is an apparatus that is connected to the conveyance robot 200 in such a way that they can communicate with each other wirelessly, is an apparatus for sending an instruction regarding various tasks to the conveyance robot 200. The operation apparatus 100, which is, for example, a tablet terminal, is fixed in a place where the user can easily operate it and does not hinder the accommodation of the conveyed object. As shown in FIG. 1, the operation apparatus 100 according to this embodiment is fixed in such a way that it stands on the frame 301 that is provided horizontally in the uppermost part of the wagon 300.

The operation apparatus 100 includes a display unit 121 for presenting various kinds of information to a user U and an operation accepting unit 120 which is a touch panel disposed over the display unit 121 and is an interface for allowing the user U to perform an operation. An ID sensor 130 is provided in the vicinity of the display unit 121. The ID sensor 130, which is a sensor for identifying Identification (ID) of the user U who operates the conveyance robot 200, detects, for example, a unique identifier included in an ID card owned by each user U. The ID sensor 130 includes, for example, an antenna for reading information on a radio tag. The user U brings the ID card close to the ID sensor 130, thereby causing the conveyance robot 200 to recognize the ID of the user, who is an operator.

In a place from the bottom surface part to a predetermined height, a bottom plate 302 is provided in parallel to the floor surface. The height from the floor surface to the lower surface of the bottom plate 302 is secured so that the main body block 210 of the conveyance robot 200 can enter the area between the floor surface and the lower surface of the bottom plate 302. The contact surface of the conveyance robot 200 contacts the lower surface of the bottom plate 302.

The object sensor 303 is a sensor for detecting the conveyed object 400 accommodated in the wagon 300. The object sensor 303 according to this embodiment is a reflective type photointterupter that is fixed to the frame 301 that is provided horizontally in the uppermost part of the wagon 300 and detects that an object has passed below the object sensor 303.

A plurality of shelf boards 310 are provided in parallel to the floor surface and in such a way that they are separated from one another inside the frame body of the wagon 300. The shelf boards 310 are configured in such a way that the conveyed object 400 is placed on the upper surface of each of the shelf boards 310. The conveyed object 400 is, for example, a tray that enables a patient of the hospital to have a meal, and includes dishes placed on the tray. Further, the dishes may include food left over by the patient.

While the wagon 300 shown in FIG. 1 is configured to accommodate the aforementioned tray, the wagon 300 may have various configurations depending on the conveyed object to be accommodated. For example, the wagon 300 for accommodating the bed linen may have an upper side of the bottom plate 302 formed of a member having a basket shape or a bag shape in place of the shelf board 310. Further, the wagon 300 may have a configuration in which the operation apparatus 100 is fixed thereto. When the wagon 300 and the operation apparatus 100 are integrated with each other, the operation apparatus 100 is set so that it performs an operation on the fixed wagon 300. That is, the user U does not need to perform the operation of selecting the wagon 300. Thus the user is able to easily input information regarding the stability that corresponds to the wagon 300. Further, the wagon 300 may have a configuration in which it does not include the casters 320.

A camera 500 is fixed onto the ceiling surface of the place where the wagon 300 is provided in the facility and captures images of the wagon 300 that is present below the camera 500 and at least a part of an area in the vicinity of the wagon 300 from the fixed place. Thus the camera 500 is configured to be able to capture images of the conveyed object 400 accommodated in the wagon 300.

Referring next to FIG. 2, a system configuration of the conveyance system will be described. FIG. 2 is a block diagram of the conveyance system according to the first embodiment. The conveyance system 10 includes an operation apparatus 100, a conveyance robot 200, an object sensor 303, and a camera 500.

The operation apparatus 100 includes, as its main components, an arithmetic processing unit 110, an operation accepting unit 120, a display unit 121, a data acquisition trigger 123, an ID sensor 130, a storage unit 140, and a communication unit 150.

The arithmetic processing unit 110 is an information processing apparatus including an arithmetic unit such as a Central Processing Unit (CPU). The arithmetic processing unit 110 includes hardware included in the arithmetic processing unit 110 and a program stored in the hardware. That is, the processing executed by the arithmetic processing unit 110 is implemented either by hardware or software. The arithmetic processing unit 110 includes a system controller 111, an image data acquisition unit 112, and a setting unit 113.

The system controller 111 receives information from each of the components of the operation apparatus 100 and sends various instructions to each of the components in response to the received information.

The image data acquisition unit 112 receives a trigger signal from the data acquisition trigger 123 and acquires image data at the time back dated from the time related to the trigger signal by a preset period (e.g., for three seconds) in accordance with the received trigger signal. The image data acquisition unit 112 acquires this image data from a plurality of pieces of image data temporarily stored in a buffer memory 122. That is, the buffer memory 122 accumulates image data for a period (e.g., five seconds) which is longer than the aforementioned preset period (e.g., three seconds). Upon acquiring the image data, the image data acquisition unit 112 supplies the acquired image data to the setting unit 113.

The setting unit 113 receives the image data from the image data acquisition unit 112 and refers to a database stored in the storage unit 140 to set the operation parameter of the conveyance robot in the drive controller 241. The operation parameter of the conveyance robot is, for example, an acceleration when the raising/lowering unit 211 is driven, an acceleration or a maximum speed when the driving wheels 213 are driven or the like.

The operation accepting unit 120 accepts the input operation from the user and transmits an operation signal to the arithmetic processing unit 110. As means for accepting the input operation from the user, the operation accepting unit 120 includes a touch panel disposed over the display unit 121. The operation accepting unit 120 may include, in place of the touch panel or besides the touch panel, operation means such as a button or a lever. The user U turns on/off a power supply and/or performs an operation of inputting various tasks by operating the above-described input operation means.

The display unit 121 is a display unit including, for example, a liquid crystal panel and displays various kinds of information regarding the conveyance system 10. The display unit 121 is provided with a touch panel that accepts an operation from the user U and displays the content in conjunction with the touch panel.

The buffer memory 122 includes a volatile or nonvolatile memory and functions as a so-called ring buffer. The buffer memory 122 receives image data from the camera 500 via the communication unit 150 and accumulates a plurality of pieces of image data for a preset period (e.g., for five seconds). The buffer memory 122 supplies at least one of the plurality of pieces of image data to the image data acquisition unit 112 in accordance with a request from the image data acquisition unit 112.

The data acquisition trigger 123 is connected to the object sensor 303 in such a way that they can communicate with each other by wire or wirelessly and receives a signal indicating that an object has been detected from the object sensor 303. Further, the data acquisition trigger 123 supplies the trigger signal to the image data acquisition unit 112 of the arithmetic processing unit 110 in accordance with the signal received from the object sensor 303.

The ID sensor 130 is connected to the arithmetic processing unit 110 and supplies information regarding the detected ID to the arithmetic processing unit 110.

The storage unit 140, which includes a nonvolatile memory such as a flash memory or a Solid State Drive (SSD), stores, for example, a database and a floor map. The storage unit 140 is connected to the arithmetic processing unit 110 and supplies the stored information to the arithmetic processing unit 110 in accordance with a request from the arithmetic processing unit 110. The database is information in which the image data of the conveyed object 400 is associated with the operation parameter of the conveyance robot 200. The details of the database will be described later. The floor map is a map of the facility that the conveyance robot 200 uses for its autonomous movement. The floor map includes information on areas that are candidates for a route through which the conveyance robot 200 autonomously moves, information on the place where the wagon 300 is placed and the place to which the wagon 300 is to be delivered and the like.

The communication unit 150, which is an interface through which it is connected to the conveyance robot 200 so that they can communicate with each other, includes, for example, an antenna, a circuit for modulating or demodulating a signal that is transmitted through the antenna and the like. The communication unit 150, which is connected to the arithmetic processing unit 110, supplies a predetermined signal received from the conveyance robot 200 to the arithmetic processing unit 110 by wireless communication. Further, the communication unit 150 transmits the predetermined signal received from the arithmetic processing unit 110 to the conveyance robot 200. The communication unit 150 is also configured so that it can communicate with the camera 500 wirelessly. The communication unit 150 receives the image data captured and generated by the camera 500 from the camera 500 and supplies the received image data to the arithmetic processing unit 110.

The object sensor 303 is connected to the data acquisition trigger 123 of the operation apparatus 100 and supplies a signal indicating that the conveyed object 400 has been detected to the data acquisition trigger 123. The camera 500 is connected to the communication unit 150 of the operation apparatus 100 in such a way that they can communicate with each other wirelessly and supplies the generated image data to the operation apparatus 100.

The conveyance robot 200 includes a stop button 222, a conveyance operation processing unit 240, a group of sensors (hereinafter referred to as a sensor group) 250, a raising/lowering drive unit 251, a movement drive unit 252, a warning issuing unit 253, a storage unit 260, and a communication unit 270.

The stop button 222, which is connected to the conveyance operation processing unit 240, supplies a signal when the stop button is pressed to the conveyance operation processing unit 240.

The conveyance operation processing unit 240, which is an information processing apparatus including an arithmetic unit such as a CPU, acquires information from the respective components of the conveyance robot 200 and sends instructions to the respective components. The conveyance operation processing unit 240 includes a drive controller 241. The drive controller 241 controls operations of the raising/lowering drive unit 251, the movement drive unit 252, and the warning issuing unit 253. When the drive controller 241 has received the information regarding the operation parameter from the setting unit 113, the drive controller 241 performs processing of controlling the raising/lowering drive unit 251, the movement drive unit 252, and the warning issuing unit 253 in accordance with the received information.

The sensor group 250, which is a general term for various sensors included in the conveyance robot 200, includes the distance measurement sensor 212 and the posture sensor. The sensor group 250 is connected to the conveyance operation processing unit 240 and supplies the detected signal to the conveyance operation processing unit 240. The sensor group 250 may include, for example, besides the distance measurement sensor 212, a position sensor provided in the raising/lowering unit 211, a rotary encoder provided in the driving wheels 213 or the like. Further, the sensor group 250 may include, for example, besides the aforementioned sensors, a posture sensor configured to detect the inclination of the main body block 210.

The raising/lowering drive unit 251 includes a motor driver for driving the raising/lowering unit 211. The raising/lowering drive unit 251 is connected to the conveyance operation processing unit 240 and is driven upon receiving an instruction from the drive controller 241. The instruction from the drive controller 241 includes, for example, a signal for specifying the operation acceleration of the motor.

The movement drive unit 252 includes a motor driver for driving each of the two driving wheels 213. The movement drive unit 252 is connected to the conveyance operation processing unit 240 and is driven upon receiving an instruction from the drive controller 241. The instruction from the drive controller 241 includes, for example, a signal for specifying the operation acceleration of the motor (moving acceleration of the conveyance robot 200).

The warning issuing unit 253, which is a notification apparatus for issuing a warning to passersby, etc. who are present in the vicinity of the conveyance robot 200 via the speaker 215, includes a driver that drives the speaker 215. The warning issuing unit 253 is connected to the conveyance operation processing unit 240 and is driven upon receiving an instruction from the drive controller 241. The instruction from the drive controller 241 includes, for example, a signal for specifying the volume (notification level) when a warning is issued.

The storage unit 260 includes a nonvolatile memory and stores the floor map and the operation parameter. The floor map, which is a database that is necessary for the conveyance robot 200 to autonomously move, includes information that is the same as at least a part of the floor map stored in the storage unit 140 of the operation apparatus 100. The operation parameter includes information for instructing, when the conveyance robot 200 has received an instruction regarding the operation parameter from the operation apparatus 100, each of the components to perform an operation in accordance with the received instruction.

Referring next to FIGS. 3-6, one example of the operation in which the conveyance robot 200 conveys the wagon 300 will be described. The wagon 300 described here accommodates clearing trays (trays after the meals thereon have been eaten) after inpatients staying in the hospital have had a meal. The conveyance robot 200 executes a task of conveying the wagon 300 which accommodates the clearing trays.

Figure 3:
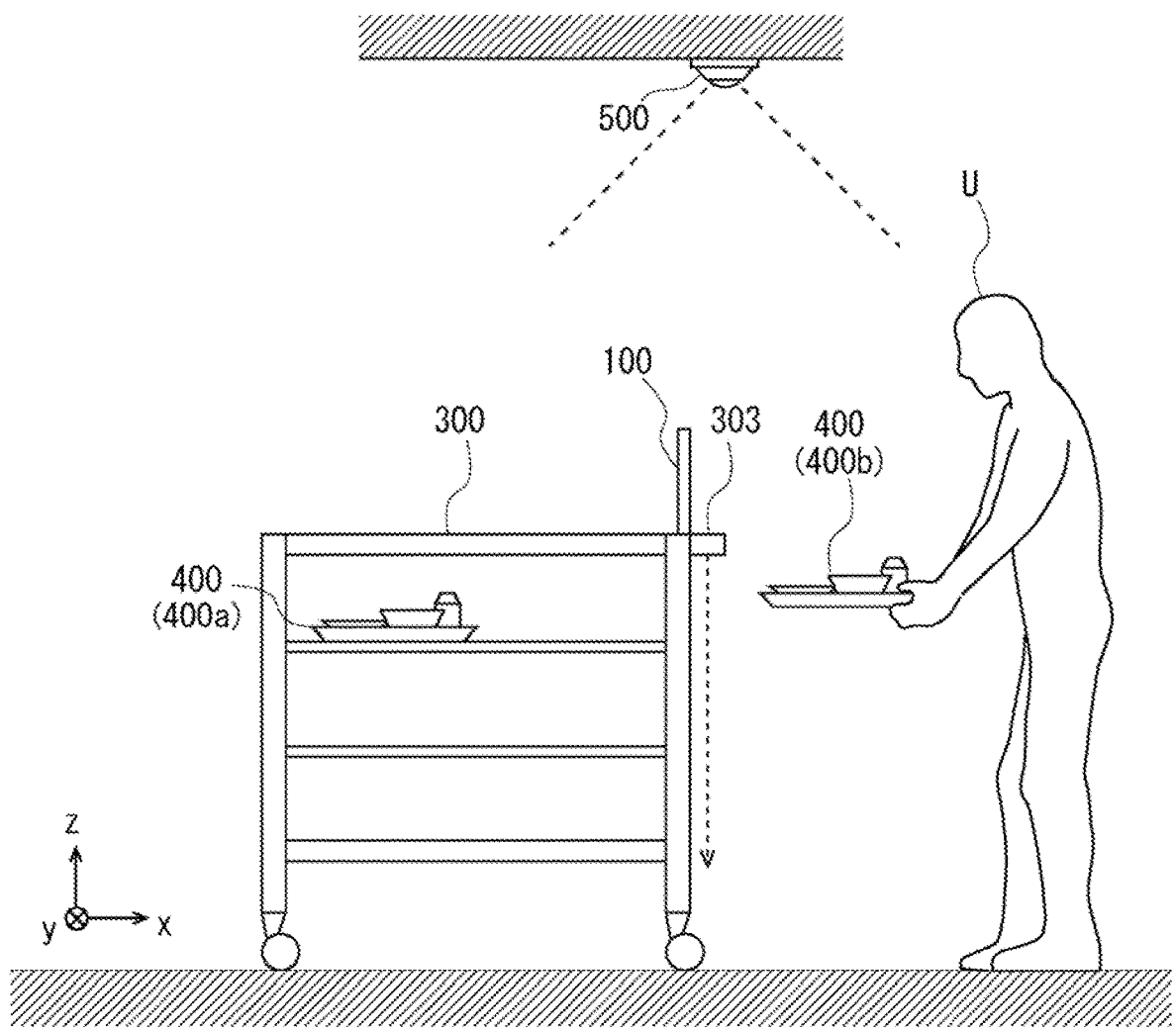
FIG. 3 is a first diagram showing an example in which the conveyance system is used.

FIG. 3 is a first diagram showing an example in which the conveyance system is used. FIG. 3 shows the wagon 300, the user U, and the camera 500. The wagon 300 is placed in the vicinity of a hospital room in the hospital where an inpatient stays. The position where the wagon 300 is placed is predetermined and the conveyance robot 200 is able to move to an area in the vicinity of the wagon 300 by its autonomous movement. The wagon 300 accommodates a clearing tray 400a, which is the conveyed object 400. Further, the user U who holds a clearing tray 400b is trying to store the clearing tray 400b in the wagon 300 in the vicinity of the wagon 300. The camera 500 is provided on the ceiling surface of the position where the wagon 300 is placed. The camera 500 captures images of clearing trays accommodated in the wagon 300 and transmits image data generated by image capturing to the operation apparatus 100.

In the aforementioned circumstances, the user U stores the clearing tray 400b, which is the conveyed object 400, in the wagon 300. At this time, the clearing tray 400b passes through the range detected by the object sensor 303. When the object sensor 303 has detected the clearing tray 400b, the image data acquisition unit 112 of the operation apparatus 100 acquires the image data at the time back dated from the time when the object sensor 303 has detected the clearing tray 400b by a preset period. Then the setting unit 113 sets the operation parameter of the conveyance robot 200 from this image data and the database stored in the storage unit 140.

After the clearing tray 400b is accommodated in the wagon 300, the user U who is able to operate the operation apparatus 100 of the conveyance system 10 operates the operation apparatus 100 and inputs a task for conveying the wagon 300. Upon receiving an instruction from the operation apparatus 100, the conveyance robot 200 starts moving from a predetermined place where it has waited to the place where the wagon 300 is present.

Figure 4:
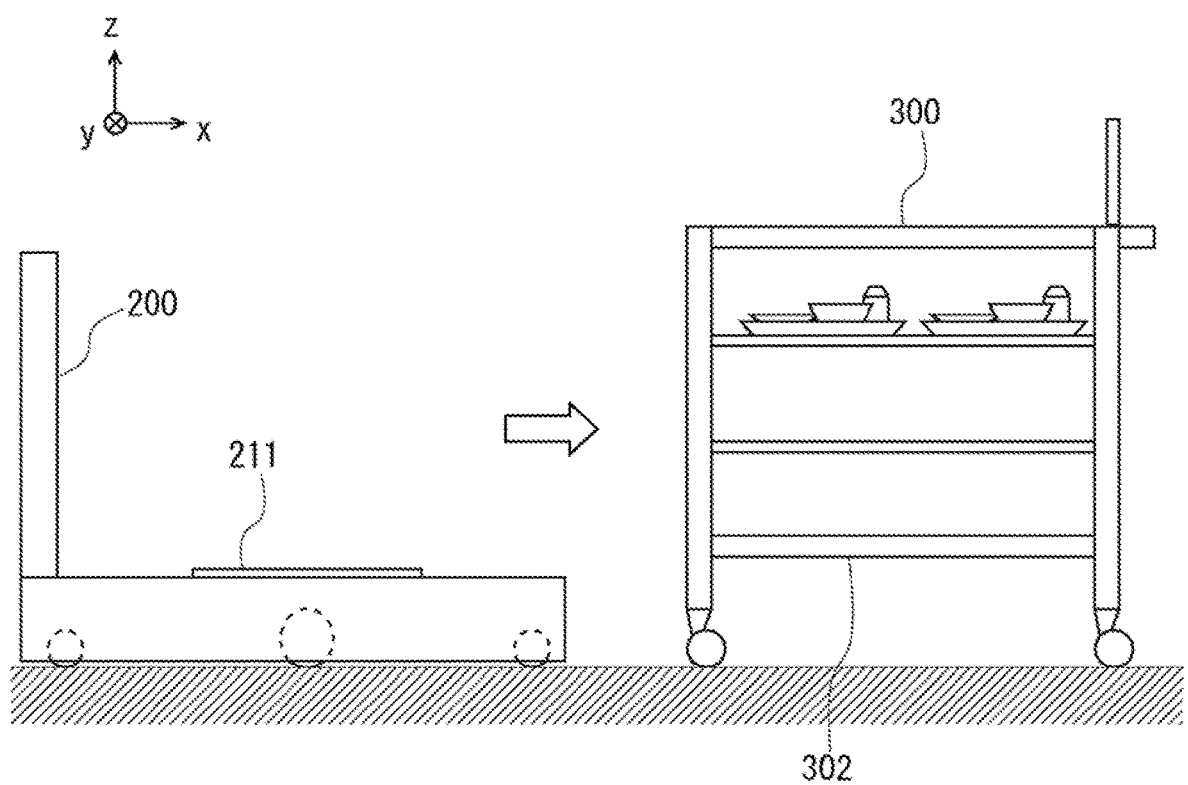
FIG. 4 is a second diagram showing an example in which the conveyance system is used.

FIG. 4 is a second diagram showing an example in which the conveyance system 10 is used. FIG. 4 shows a state in which the conveyance robot 200 that has moved from a predetermined place to the place where the wagon 300 is present is approaching the wagon 300 in order to convey the wagon 300. The conveyance robot 200 enters underneath the wagon 300 from the front part. At this time, the raising/lowering unit 211 is set in a position lower than the bottom plate 302 of the wagon 300.

Figure 5:
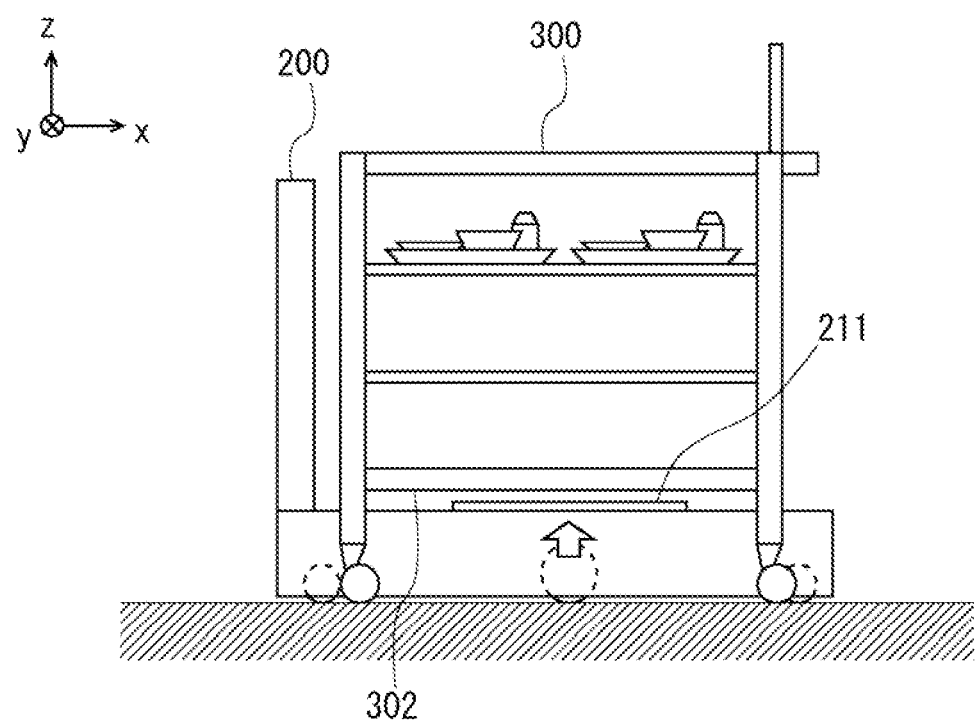
FIG. 5 is a third diagram showing an example in which the conveyance system is used.

FIG. 5 is a third diagram showing an example in which the conveyance system is used. The conveyance robot 200 temporarily stops at a place where the raising/lowering unit 211 is positioned in the vicinity of the center of the wagon 300. Next, the conveyance robot 200 performs an operation of raising the raising/lowering unit 211 to cause the raising/lowering unit 211 to contact the bottom plate 302, thereby raising the wagon 300.

Figure 6:
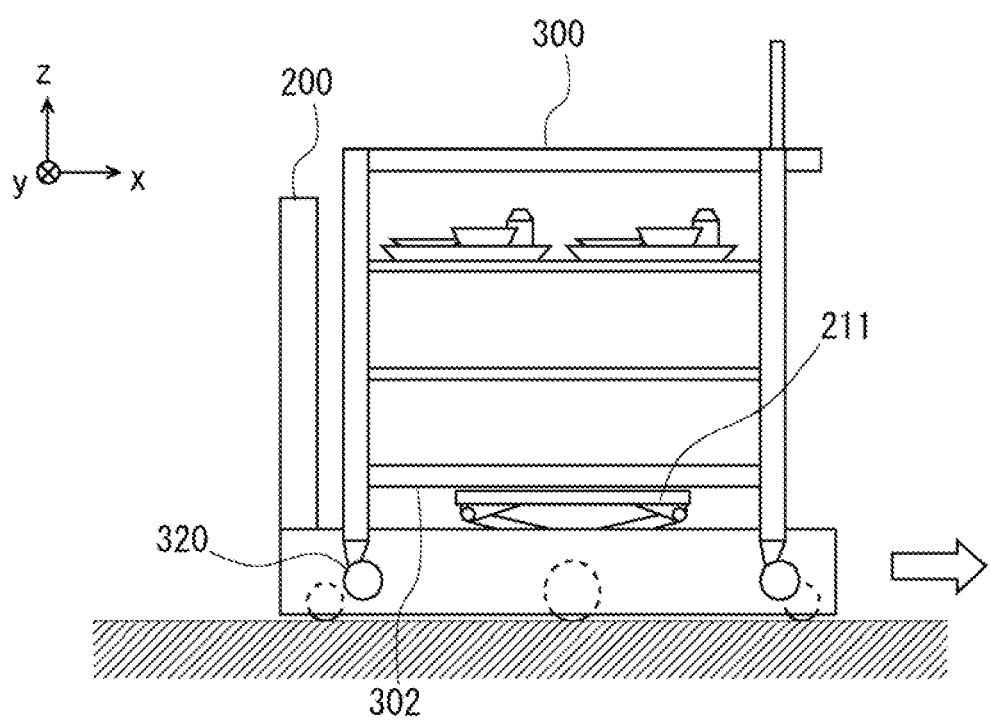
FIG. 6 is a fourth diagram showing an example in which the conveyance system is used.

FIG. 6 is a fourth diagram showing an example in which the conveyance system is used. FIG. 6 shows a state in which the conveyance robot 200 lifts the wagon 300 since the raising/lowering unit 211 is raised. The raising/lowering unit 211 stops at the position shown in FIG. 6. Thus the casters 320 of the wagon 300 are lift up from the floor surface. In this way, the conveyance robot 200 conveys the wagon 300 that accommodates the conveyed objects 400 to the destination while maintaining the state in which the conveyance robot 200 lifts the wagon 300 from the floor surface.

The conveyance robot 200 conveys the wagon 300 by the aforementioned operations. The conveyed object 400 accommodated in the wagon 300 is subject to an impact associated with the raising/lowering operation when the wagon 300 is raised by the conveyance robot 200. Further, when the conveyance robot 200 moves on the floor surface, an external force such as an impact or a vibration is applied to the conveyed object 400 due to an acceleration, a deceleration, and a turn performed by the conveyance robot 200 or when the conveyance robot 200 moves over steps on the floor surface. When a dish on the meal tray falls or food that remains on the dish is spilt due to the application of the external force, it is possible that the wagon 300, the conveyance robot 200, and even the floor surface may be contaminated by the spilt food.

Therefore, when an unstable meal tray is conveyed at the time of conveyance, it is required to reduce the external force that the meal tray receives and prevent food from being spilt by relatively reducing the acceleration of the conveyance robot 200. In order to achieve this operation, the conveyance system 10 according to this embodiment is configured to set the operation parameter of the conveyance robot 200 in accordance with the image data of the conveyed object 400.

With reference to FIG. 7, a relation between the state of the conveyed object 400 and the operation parameter of the conveyance robot 200 will be described. FIG. 7 is a table showing an example of the relation between the state of the conveyed object 400 and the operation parameter of the conveyance robot 200.

A table T10 shows the "clearing tray" as an example of the conveyed object in the left column. This indicates that the conveyance robot 200 conveys the clearing tray. The right column of the conveyed object shows the "state of conveyed object". The state of the conveyed object shows, as the items that correspond to the conveyed object: "clearing tray", "amount of leftover food is small", "objects in tray are neatly placed", "amount of leftover food is large", and "objects in tray are scattering", from the top to the bottom.

The right column of the state of the conveyance object shows "classification" that corresponds to the state of the conveyance object. The classification is indicated by two items: "stable" and "unstable". That is, the state of the conveyed object at the time of conveyance is classified into these two states. As the classification that corresponds to "amount of leftover food is small" and "objects in tray are neatly placed" regarding the state of the conveyed object, "stable" is shown. On the other hand, as the classification that corresponds to "amount of leftover food is large" and "objects in tray are scattering", "unstable" is shown.

The right column of the classification shows the "operation parameter" that corresponds to each of the categories. The operation parameter is indicated by two items: a "parameter set A" and a "parameter set B". The "stable" in the aforementioned classification corresponds to the "parameter set A" and the "unstable" in the aforementioned classification corresponds to the "parameter set B".

The above operation parameters further include each of the operation parameter of the "raising/lowering drive unit" and the operation parameter of the "movement drive unit". Regarding the "raising/lowering drive unit", the acceleration mode of the raising/lowering drive unit 251 is indicated by an "acceleration mode D1" and an "acceleration mode D2". The parameter set A corresponds to the "acceleration mode D1" and the parameter set B corresponds to the "acceleration mode D2". Each of the "acceleration mode D1" and the "acceleration mode D2" is defined in such a way that the raising/lowering acceleration when the raising/lowering unit 211 is raised/lowered becomes a predetermined value. The maximum acceleration of the acceleration mode D2 is set to be smaller than the maximum acceleration of the acceleration mode D1. That is, when the acceleration mode D2 is selected as the operation parameter of the raising/lowering drive unit 251, the speed of the motion of the raising/lowering unit 211 becomes relatively lower than that when the acceleration mode D1 is selected.

Likewise, regarding the "moving acceleration", the acceleration mode of the movement drive unit 252 is indicated by an "acceleration mode F1" and an "acceleration mode F2". The parameter set A corresponds to the "acceleration mode F1" and the parameter set B corresponds to the "acceleration mode F2". Each of the "acceleration mode F1" and the "acceleration mode F2" is defined in such a way that the moving acceleration of the conveyance robot 200 related to the rotation of the driving wheels 213 becomes a predetermined value. The maximum acceleration of the acceleration mode F2 is set to be smaller than the maximum acceleration of the acceleration mode F1. That is, when the acceleration mode F2 is selected as the operation parameter of the movement drive unit 252, the speed of the motion of the driving wheels 213 becomes relatively lower than that when the acceleration mode F1 is selected.

According to the database shown in the aforementioned table T10, when the conveyance robot 200 carries the clearing tray, the conveyed object is classified as "stable" in the case in which the amount of leftover food that remains in the clearing tray is small or objects in the tray are neatly placed. When the conveyed object has been classified as stable, regarding the operation parameter of the conveyance robot 200, the raising/lowering drive unit 251 is set to the acceleration mode D1 and the movement drive unit 252 is set to the acceleration mode F1 as the parameter set A.

On the other hand, when the amount of leftover food that remains in the clearing tray is large or objects in the tray are scattering, the conveyed object is classified as "unstable". When the conveyed object has been classified as unstable, regarding the operation parameter of the conveyance robot 200, the raising/lowering drive unit 251 is set to the acceleration mode D2 and the movement drive unit 252 is set to the acceleration mode F2 as the parameter set B. When the conveyed object has been classified as unstable, the conveyance robot 200 operate in such a way that an impact given to the conveyed object 400 becomes relatively small. In the aforementioned table T10, the "state of conveyed object" classified into unstable can be defined as a case except for the state in which the conveyance object is classified as stable.

Figure 8:
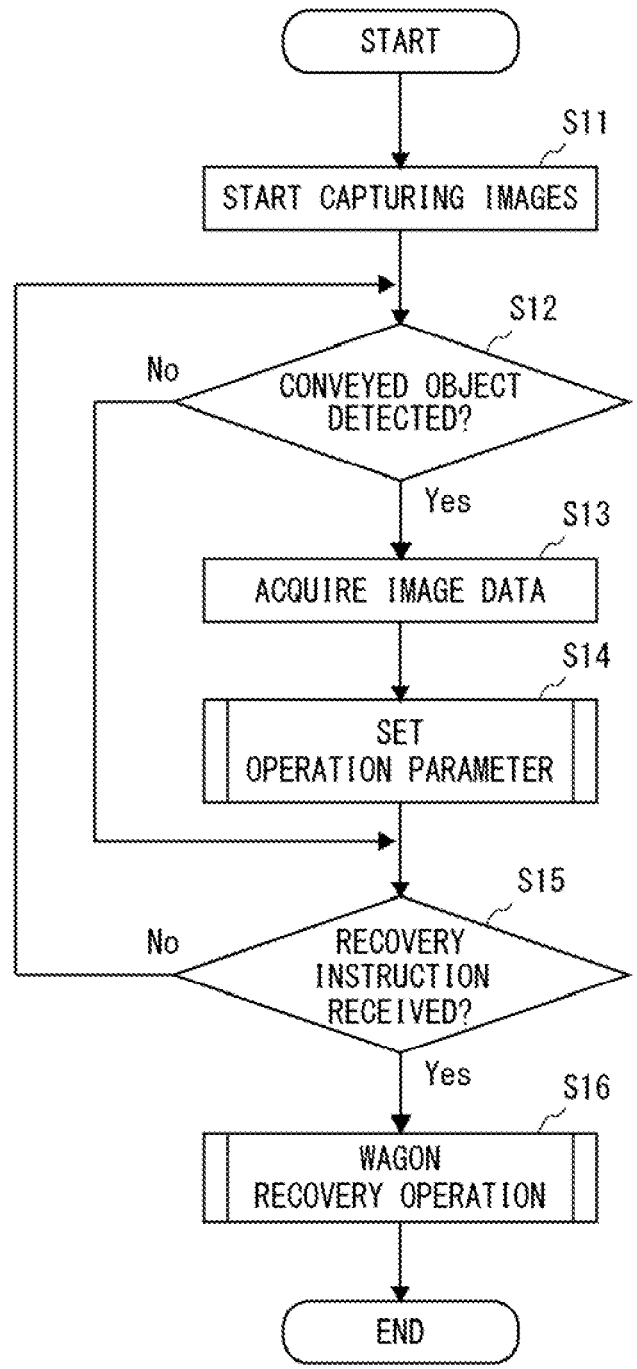
FIG. 8 is a flowchart showing processing of the conveyance system.

Referring next to FIG. 8, processing performed by the conveyance system 10 will be described. FIG. 8 is a flowchart showing processing of the conveyance system. The flowchart shown in FIG. 8 shows the processing performed by the arithmetic processing unit 110. The arithmetic processing unit 110 starts the following processing by detecting, for example, that the wagon 300 has been placed in a predetermined position.

First, the arithmetic processing unit 110 instructs the camera 500 to start capturing images (Step S11). Upon receiving the instruction for starting capturing images, the camera 500 captures images at a predetermined frame rate (e.g., 30 frames per second) and transmits the image data generated by capturing images to the operation apparatus 100.

Next, the arithmetic processing unit 110 determines whether it has received a signal indicating that the conveyed object 400 has been detected from the object sensor 303 (Step S12). When it is not determined that it has received the signal indicating that the conveyed object 400 has been detected from the object sensor 303 (Step S12: No), the arithmetic processing unit 110 moves to Step S15. On the other hand, when it is determined that it has received the signal indicating that the conveyed object 400 has been detected from the object sensor 303 (Step S12: Yes), the arithmetic processing unit 110 moves to Step S13.

In Step S13, the arithmetic processing unit 110 acquires the image data (Step S13). More specifically, the data acquisition trigger 123 that has received a signal indicating that the conveyed object 400 has been detected supplies a trigger signal to the arithmetic processing unit 110. The image data acquisition unit 112 of the arithmetic processing unit 110 that has received the trigger signal acquires the image data at a time back dated from the image data stored in the buffer memory 122 by a preset period.

Next, the arithmetic processing unit 110 performs processing of setting the operation parameter (Step S14). While the details of the processing performed in Step S14 will be described later, the setting unit 113 sets the operation parameter using the image data supplied from the image data acquisition unit 112 and the database stored in the storage unit 140.

In Step S15, the arithmetic processing unit 110 determines whether or not it has received an instruction for conveying the conveyed object 400, in other words, whether or not it has received a task for recovering the wagon 300 (Step S15). When it is not determined that it has received the instruction for recovering the wagon 300 (Step S15: No), the arithmetic processing unit 110 goes back to Step S12. On the other hand, when it has been determined that it has received an instruction for recovering the wagon 300 (Step S15: Yes), the arithmetic processing unit 110 moves to Step S16.

In Step S16, the arithmetic processing unit 110 sends an instruction for performing an operation for recovering the wagon 300 to the conveyance robot 200. The arithmetic processing unit 110 sends an instruction for conveying the wagon 300 by the operation parameter set by the setting unit 113. After Step S16, the arithmetic processing unit 110 ends a series of processes.

Figure 9:
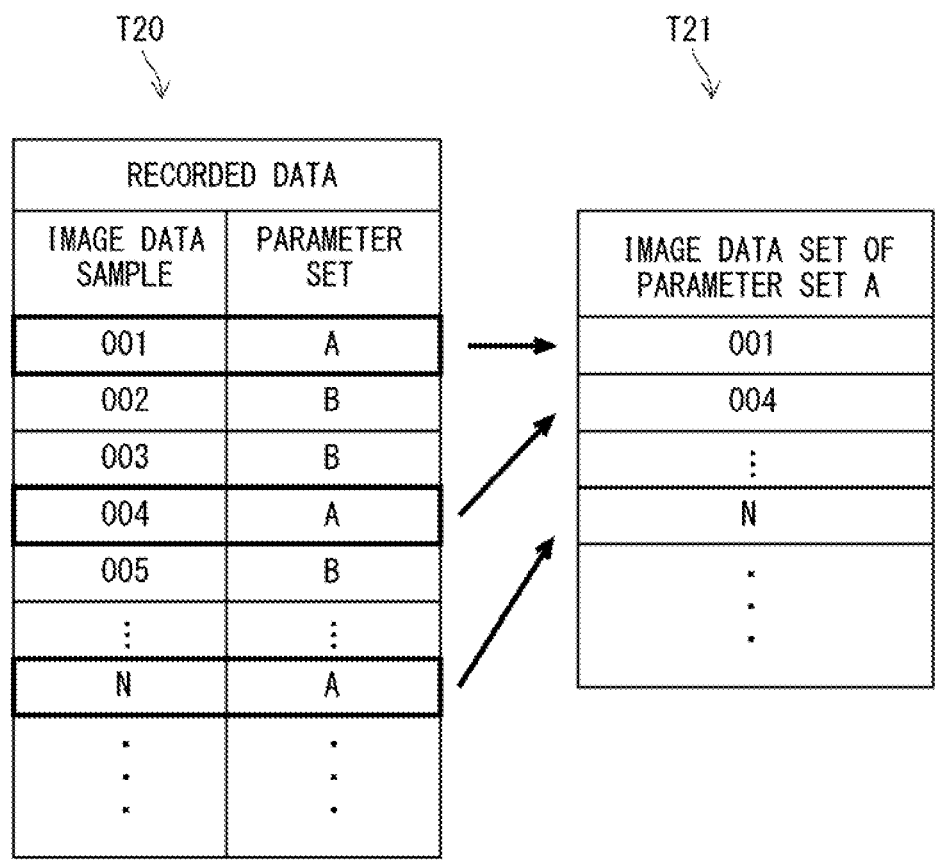
FIG. 9 is a table showing an example of a database.

Next, detail of the operation parameter setting processing will be described. FIG. 9 is a table showing an example of the database. FIG. 9 shows recorded data T20 and a database T21. The recorded data T20 shows samples of the image data obtained by capturing images of the clearing tray and parameter sets of the operation parameters that correspond to the respective samples of the image data.

Regarding the sample 001 in the recorded data T20, for example, the operation parameter corresponds to the parameter set A shown in FIG. 7. This shows that the clearing tray included in the sample 001 of the image data is classified into "stable" and it can be conveyed by the parameter set A. Further, regarding the sample 002, for example, the operation parameter corresponds to the parameter set B. This shows that the clearing tray included in the sample 002 of the image data is classified into "unstable" and it cannot be conveyed by the parameter set A and can be conveyed by the parameter set B.

The database T21 shown in the right part of the recorded data T20 is obtained by extracting image data samples that correspond to the parameter set A included in the recorded data T20 and forming the extracted image data samples in a form of a database as reference image data. The database of the storage unit 140 according to this embodiment stores information including the database T21. The setting unit 113 compares the image data received from the image data acquisition unit 112 with the image data set included in the database T21. When the image data received from the image data acquisition unit 112 coincides or substantially coincides with the reference image data included in the database T21 as a result of the comparison, it can be determined that the parameter set A can be set. In this way, by comparing the image data of the conveyed object 400 related to the conveyance with the samples of the image data stored in advance (reference image data), the conveyance system 10 is able to set the operation parameters.

Figure 10:
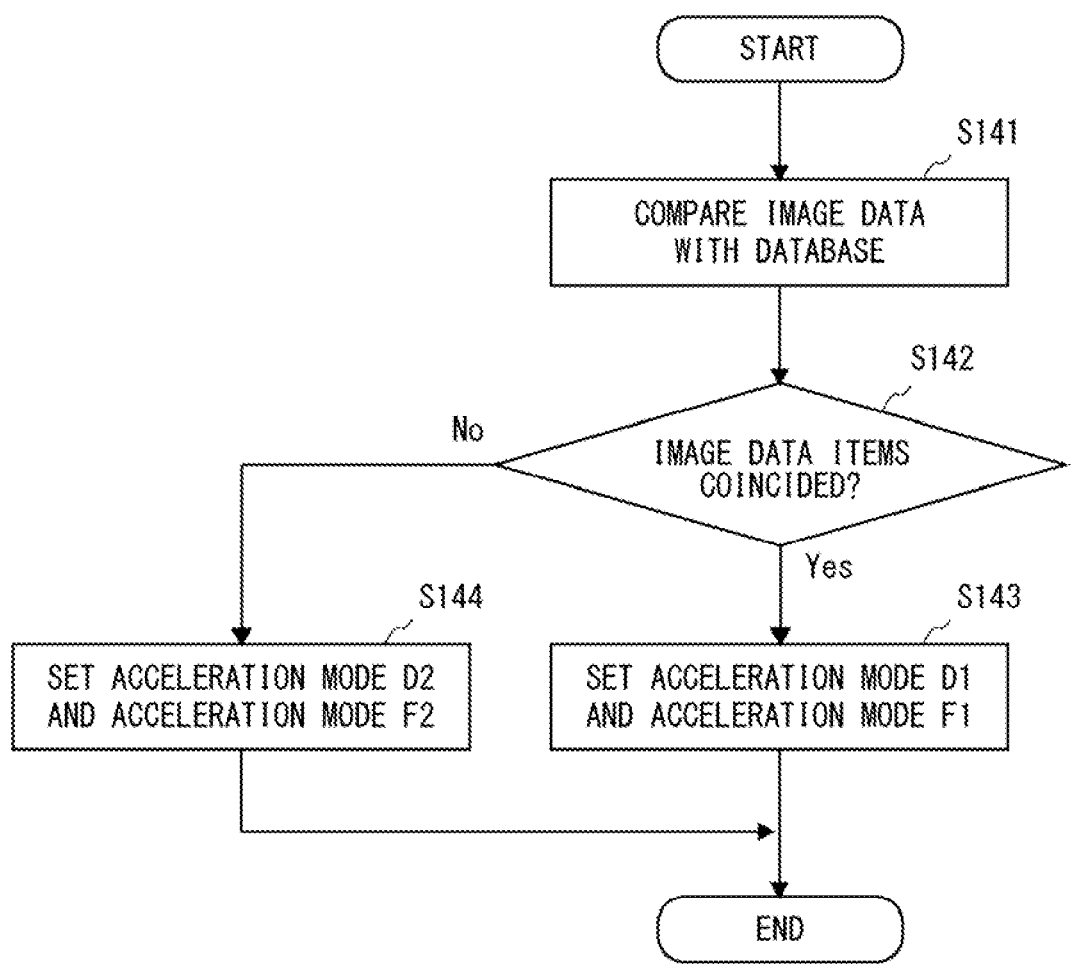
FIG. 10 is a flowchart showing setting processing according to the first embodiment.

Referring next to FIG. 10, details of the setting processing in the conveyance system 10 will be described. FIG. 10 is a flowchart showing the setting processing by image collation. The flowchart shown in FIG. 10 indicates the detail of Step S14 in FIG. 8.

First, the setting unit 113 compares the image data received from the image data acquisition unit 112 (i.e., the image data related to the conveyance) with the database stored in the storage unit 140 (Step S141).

Next, the setting unit 113 determines whether or not the image data related to the conveyance has coincided with the image data included in the database (Step S142). Regarding the technique for determining whether or not these image data items coincide with each other by comparing these image data items, images are processed by various methods, and these image data items are compared using the image data that has been subjected to processing. These methods have already been known to those skilled in the art. Thus the description of the details thereof will be omitted.

When it has been determined that the image data related to the conveyance has coincided with the image data included in the database (Step S142: Yes), the setting unit 113 proceeds to Step S143. Then the setting unit 113 sets the acceleration mode D1 of the raising/lowering drive unit 251 and the acceleration mode F1 of the movement drive unit 252 as the parameter set A (Step S143), and ends the setting processing.

When it has not been determined that the image data related to the conveyance has coincided with the image data included in the database (Step S142: No), the setting unit 113 proceeds to Step S144. Then the setting unit 113 sets, as the parameter set B, the acceleration mode D2 of the raising/lowering drive unit 251 and the acceleration mode F2 of the movement drive unit 252 (Step S144), and ends the setting processing.

While the first embodiment has been described above, the conveyance system 10 according to the first embodiment is not limited to have the aforementioned configuration. For example, as the operation parameter, it is sufficient that at least one of the parameters related to the conveyance operation of the conveyance robot 200 be included. Therefore, the operation parameter may be only the acceleration of the raising/lowering drive unit 251 or may be only the acceleration of the movement drive unit 252.

Further, the operation parameter is not limited to the aforementioned items. The operation parameter may be, for example, a moving path of the conveyance robot 200. In this case, the floor map stored in the storage unit 140 and the storage unit 260 includes a plurality of pieces of information on the path through which the conveyed object 400 is conveyed to the destination. The information on the path includes information regarding steps and slopes on the floor surface. In the database, the operation parameter is associated so that a path in which the steps and slopes on the floor surface are small can be selected when the conveyed object is classified as unstable. With this configuration, the conveyance system 10 is able to select a suitable conveyance path in accordance with the stability information input from the user U.

The operation parameter may be the volume of the speaker 215 set in the warning issuing unit 253. In this case, the volume of the warning when a relatively unstable conveyed object is conveyed is set to be larger than the volume of the warning when a relatively stable conveyed object is conveyed. With this configuration, when a relatively unstable conveyed object is conveyed, it is possible to call attention to surrounding passersby, etc. who are present in a relatively wide range. Therefore, the conveyance system 10 is able to prevent a situation in which the passersby, etc. unexpectedly contact the conveyance robot 200 and to prevent collapse of the conveyed object and the like.

Further, the operation parameter may be, besides the ones described above, a range of detecting a safe distance from the obstacle detected by the distance measurement sensor 212. That is, the safe distance when a relatively unstable conveyed object is conveyed is set to be longer than the safe distance when a relatively stable conveyed object is conveyed. Thus, when a relatively unstable conveyed object is conveyed, a safe distance can be secured with respect to surrounding obstacles in a relatively wide range. Therefore, the conveyance system 10 is able to prevent a situation in which an obstacle unexpectedly contacts the conveyance robot 200 and to prevent collapse of the conveyed object and the like.

Further, the conveyance robot included in the conveyance system is not limited to have the aforementioned configuration. For example, the conveyance robot may include a configuration in which it tows the wagon instead of raising the wagon by the raising/lowering unit and conveying the wagon. Further, the conveyance robot may include an accommodation room that accommodates the conveyed object and convey the conveyed object while directly accommodating the conveyed object. In this case, the conveyance robot that includes the accommodation room may have a configuration in which it includes an operation unit with which the operation apparatus is integrated. When this configuration is employed, the user stores the conveyed object in the accommodation room of the conveyance robot and inputs information regarding the stability of the conveyed object that has been accommodated through the operation unit that is integrated with the conveyance robot.

The object sensor 303 is not limited to the aforementioned means and may be another detection means as long as it detects that the conveyed object 400 is accommodated in the wagon 300. The object sensor 303 may be, for example, a pressure sensor that detects that the conveyed object 400 has been placed on the shelf board 310 of the wagon 300. The object sensor 303 may be a proximity sensor that uses a Near field communication (NFC) technique in which proximity communication with the conveyed object 400 is performed or a magnetic sensor that uses a Hall element. The camera 500 may not be provided onto the ceiling and may be provided in the wagon 300 or the operation apparatus 100.

As described above, according to this embodiment, it is possible to provide a conveyance system and the like capable of preferably conveying the conveyed object in accordance with the state of the conveyed object.

Second Embodiment

Figure 11:
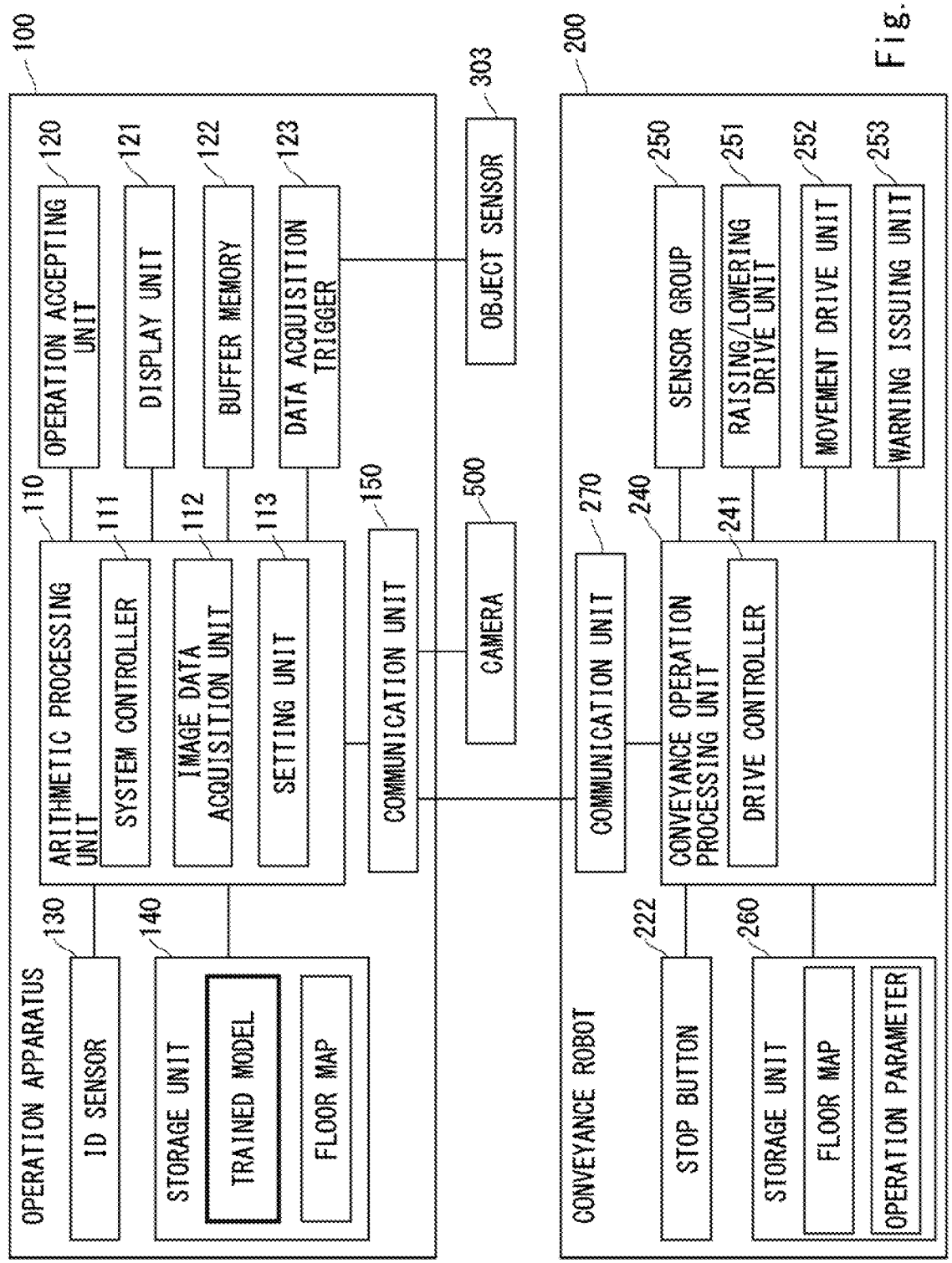
FIG. 11 is an overview diagram of a conveyance system according to a second embodiment.

Next, a second embodiment will be described. A conveyance system according to the second embodiment is different from that of the first embodiment in that the database of the storage unit 140 shown in FIG. 2 is a trained model trained by machine learning. FIG. 11 is a block diagram of the conveyance system according to the second embodiment. In the block diagram shown in FIG. 11, the storage unit 140 stores the trained model.

When the setting unit 113 has received the image data related to conveyance from the image data acquisition unit 112, the setting unit 113 inputs the received image data into the trained model. In this case, the setting unit 113 reads the program of the trained model from the storage unit 140 and inputs the image data related to conveyance into the trained model that has been read. The trained model is configured to output an operation parameter upon receiving the image data. The setting unit 113 sets, in the conveyance robot, the operation parameter output from the trained model after the image data is input.

Figure 12:
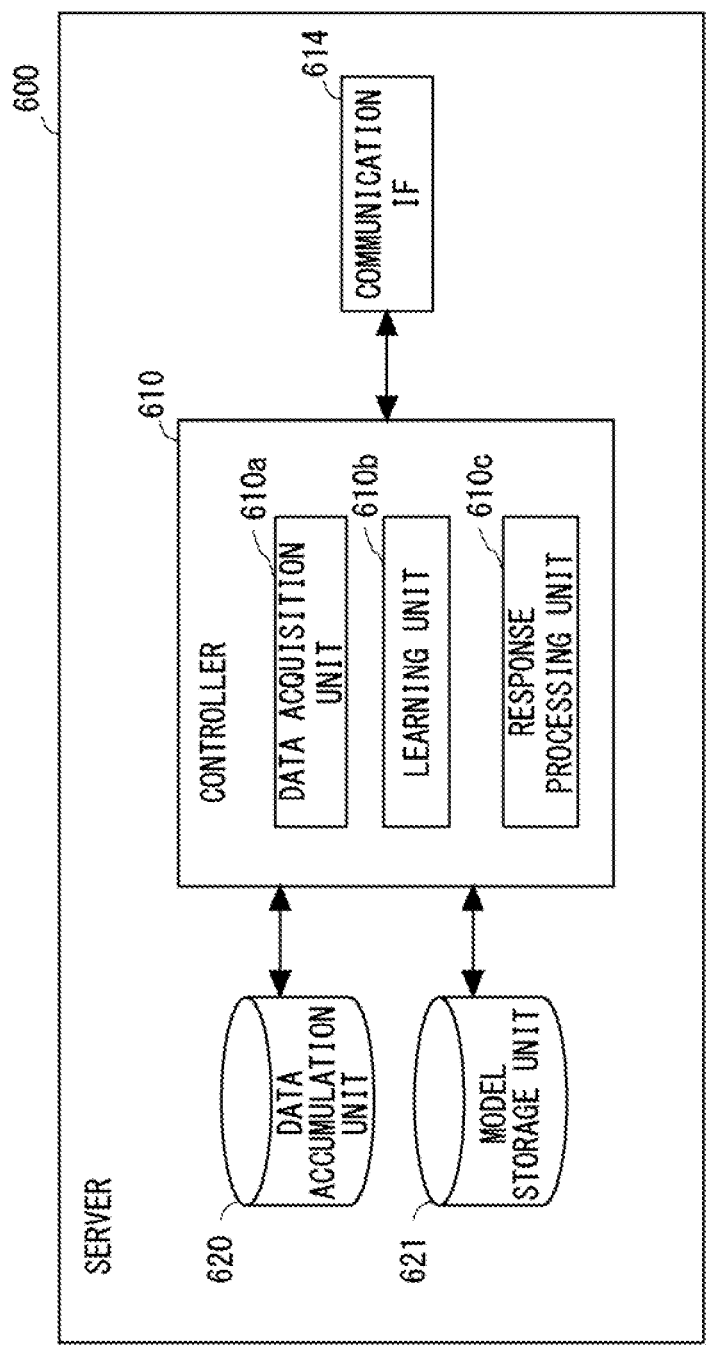
FIG. 12 is a block diagram showing a configuration of a learning model generation apparatus.

Referring next to FIG. 12, a configuration for generating the trained model will be described. FIG. 12 is a block diagram showing a configuration of the learning model generation apparatus. FIG. 12 shows one configuration example of a server 600 as a trained model generation apparatus. The server 600 includes a controller 610, a communication IF 614, a data accumulation unit 620, and a model storage unit 621. The controller 610, which is, for example, a Micro Processing Unit (MPU), executes control of the server 600 by executing a control program read from the system memory. The controller 610 includes a data acquisition unit 610a, a learning unit 610b, and a response processing unit 610c. In this case, the above control program includes a program for executing each function of the controller 610.

The communication IF 614, which includes, for example, a wired LAN interface, is a communication interface to connect to a predetermined communication network. The controller 610 receives data that is necessary to generate the trained model via the communication IF 614. The data that is necessary to generate the trained model is included, for example, in the recorded data T20 shown in FIG. 9, and is image data and data of a parameter set that corresponds to the image data.

The data accumulation unit 620, which includes, for example, a nonvolatile storage device such as a Hard disk drive (HDD) or a Solid state drive (SSD), stores the acquired data via the communication IF 614. The model storage unit 621 also includes a nonvolatile storage device such as a HDD or an SSD. The data accumulation unit 620 and the model storage unit 621 may include a common storage device.

The data acquisition unit 610a acquires, at the learning stage, image data and data regarding the parameter set that corresponds to the image data. The learning unit 610b makes the server 600 serve as a learning apparatus. When the server 600 has generated the trained model, the response processing unit 610c outputs the generated trained model via the communication IF 614.

The model storage unit 621 stores at least one of an untrained learning model (including a case in which learning is being performed) (hereinafter this model will be referred to as an untrained model) and a trained learning model (hereinafter this model will be referred to as a trained model).

Figure 13:
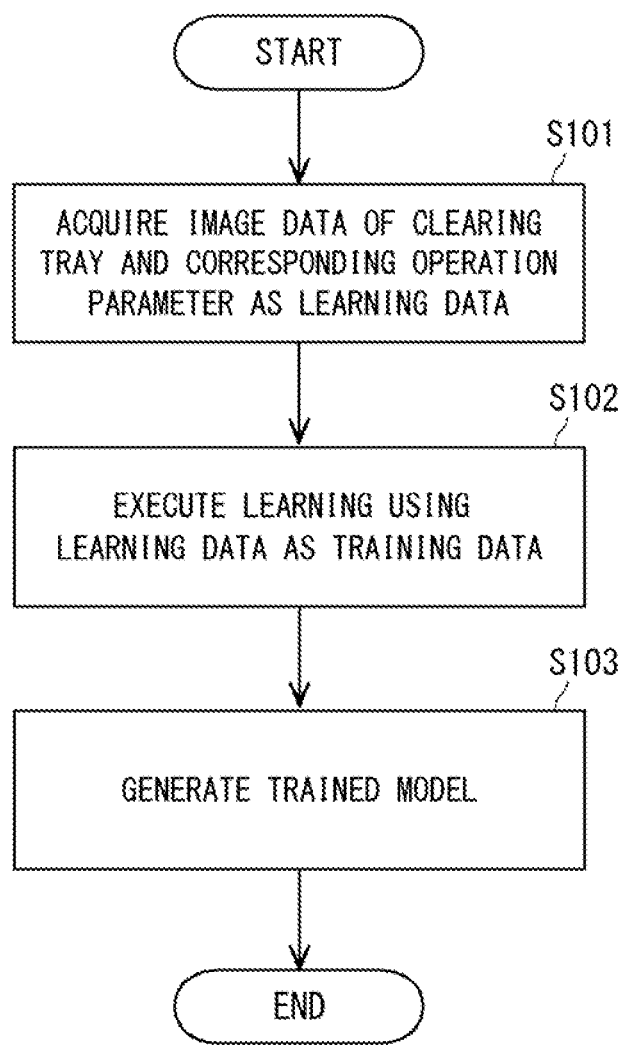
FIG. 13 is a flowchart showing processing of generating a trained model.

Next, processing performed by the trained model generation apparatus will be described. FIG. 13 is a flowchart showing processing of generating the trained model.

First, the data acquisition unit 610a of the server 600 acquires the image data of the clearing tray and the corresponding operation parameter as the learning data (Step S101). That is, when the server 600 performs learning, the image data of the clearing tray and the corresponding operation parameter are one set of learning data.

Next, the learning unit 610b of the server 600 applies the image data of the clearing tray to the input layer from the acquired learning data and executes learning using the corresponding operation parameter as training data (Step S102).

Next, the learning unit 610b generates the trained model updated by the learning that it has performed (Step S103). It is assumed that the trained model indicates a learning model at a time when the learning model updated by the aforementioned processing has become operable.

The trained model thus generated is configured to output, when it has accepted the image data obtained by capturing images of a desired conveyed object as an input, the operation parameter that corresponds to the image data of the conveyed object that has been accepted.

Note that machine learning using support vector machines or a neural network may be used as the algorithm of the learning model. In the neural network, a deep-layer neural network (DNN) with multiple hidden layers may be, for example, used. A feedforward (forward propagation) neural network such as multilayer perceptron (MLP) that employs an error back propagation method may be, for example, used as the DNN. Further, processing of convolving the image data may be performed as preprocessing.

Figure 14:
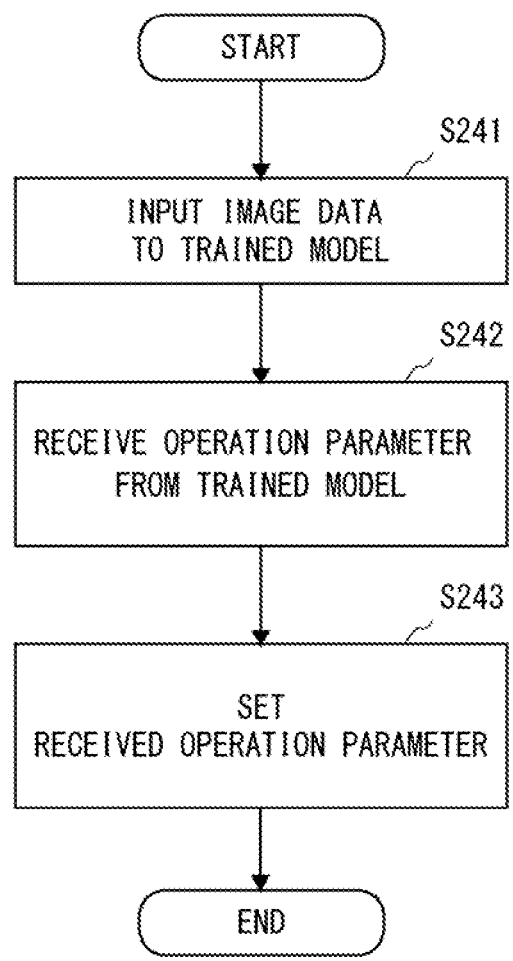
FIG. 14 is a flowchart showing setting processing according to the second embodiment.

Referring next to FIG. 14, setting processing using the trained model will be described. FIG. 14 is a flowchart showing the setting processing by the trained model. The flowchart shown in FIG. 14 indicates the details of Step S14 in the flowchart shown in FIG. 8 in the first embodiment. That is, the flowchart shown in FIG. 14 is processing performed in place of the flowchart shown in FIG. 10 in the first embodiment.

First, the setting unit 113 inputs the image data related to conveyance to the trained model (Step S241). The arithmetic processing unit 110 may perform processing of extracting a part of the clearing tray from the image data related to conveyance or processing of resizing the image data as the processing performed before the image data is input to the trained model.

Next, the setting unit 113 receives the operation parameter from the trained model as the output for the above input (Step S242). Then the setting unit 113 sets the received operation parameter as the operation parameter of the conveyance robot 200 (Step S243).

The second embodiment has been described above. According to the second embodiment, it is possible to provide a conveyance system and the like capable of preferably conveying the conveyed object in accordance with the state of the conveyed object.

The aforementioned program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the aforementioned embodiments and may be changed as appropriate without departing from the spirit of the present disclosure. For example, while the system in which the conveyance robot autonomously moves in a hospital has been described in the aforementioned embodiments, the aforementioned system is able to convey predetermined objects as conveyed objects in a hotel, a restaurant, an office building, an event venue, or a complex facility.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance system comprising:
   a conveyance robot for conveying a conveyed object;
   a controller configured to control an operation of the conveyance robot;
   an image data acquisition unit configured to acquire image data obtained by capturing images of the conveyed object;
   a storage unit configured to store a database for associating the image data of the conveyed object with an operation parameter of the conveyance robot;
   a setting unit configured to set the operation parameter of the conveyance robot in the controller based on the image data of the conveyed object that has been acquired and the database;
   an image capturing unit configured to capture images of the conveyed object; and
   a wagon that accommodates the conveyed object and is moved by the conveyance robot in a state in which the wagon accommodates the conveyed object,
   wherein the setting unit acquires the image data of the conveyed object obtained by capturing images by the image capturing unit when the conveyed object is accommodated in the wagon,
   the wagon includes a data acquisition trigger configured to detect that the wagon has accommodated the conveyed object, and
   the setting unit acquires the image data of the conveyed object obtained by capturing images by the image capturing unit at a time back dated from the time when the data acquisition trigger has detected that the wagon has accommodated the conveyed object by a preset period.

2. The conveyance system according to claim 1, wherein
   the database comprises a trained model that accepts the image data of the conveyed object as an input and outputs the operation parameter of the conveyance robot in accordance with the image data of the conveyed object that has been accepted, and
   the setting unit inputs the image data of the conveyed object into the trained model and sets the operation parameter, which is an output for the image data of the conveyed object that has been input, in the controller.

3. The conveyance system according to claim 1, wherein
   the database stores each of reference image data of the conveyed object and the operation parameter that corresponds to the reference image data of the conveyed object in advance, and
   the setting unit compares the image data of the conveyed object that has been newly acquired with the reference image data stored in the storage unit and sets the operation parameter based on a result of the comparison.

4. The conveyance system according to claim 1, wherein
   the conveyance robot comprises a raising/lowering mechanism for raising and/or lowering the wagon, and
   the setting unit sets a raising/lowering acceleration of the raising/lowering mechanism as the operation parameter.

5. The conveyance system according to claim 1, wherein the setting unit sets at least one of a moving acceleration of the conveyance robot and a moving path along which the conveyance robot passes as the operation parameter.

6. The conveyance system according to claim 1, wherein
   the conveyance robot comprises an object sensor configured to detect an object that is present in the vicinity of the conveyance robot, and
   the setting unit sets a range detected by the object sensor as the operation parameter.

7. The conveyance system according to claim 1, wherein
   the conveyance robot comprises a notification apparatus that sends a notification indicating that the conveyance robot is conveying the conveyed object to an area in the vicinity of the conveyance robot, and
   the setting unit sets a notification level of the notification apparatus as the operation parameter.

8. A control method for setting an operation parameter in a conveyance robot for conveying a conveyed object, the conveyance robot being configured to move a wagon that accommodates the conveyed object, the control method comprising:
   a storing step for storing a database for associating image data of the conveyed object with an operation parameter of the conveyance robot;
   an image data acquisition step for acquiring image data obtained by capturing images of the conveyed object;
   a setting step for setting the operation parameter based on the image data of the conveyed object that has been acquired and the database;

a control step for controlling the conveyance robot based on the set operation parameter; and an image capturing step configured to capture images of the conveyed object, wherein the setting step is configured to acquire the image data of the conveyed object obtained by capturing images when the conveyed object is accommodated in the wagon, the wagon includes a data acquisition trigger configured to detect that the wagon has accommodated the conveyed object, and the setting step is configured to acquire the image data of the conveyed object obtained by capturing images, by the image capturing step, at a time back dated from the time when the data acquisition trigger has detected that the wagon has accommodated the conveyed object by a preset period.

9. A non-transitory computer readable storage medium storing a program for causing a computer to execute a control method for setting an operation parameter in a conveyance robot for conveying a conveyed object, the conveyance robot being configured to move a wagon that accommodates the conveyed object, the control method comprising:

a storing step for storing a database for associating image data of the conveyed object with an operation parameter of the conveyance robot;

an image data acquisition step for acquiring image data obtained by capturing images of the conveyed object;

a setting step for setting the operation parameter based on the image data of the conveyed object that has been acquired and the database;

a control step for controlling the conveyance robot based on the set operation parameter; and an image capturing step configured to capture images of the conveyed object, wherein the setting step is configured to acquire the image data of the conveyed object obtained by capturing images when the conveyed object is accommodated in the wagon, the wagon includes a data acquisition trigger configured to detect that the wagon has accommodated the conveyed object, and the setting step is configured to acquire the image data of the conveyed object obtained by capturing images, by the image capturing step, at a time back dated from the time when the data acquisition trigger has detected that the wagon has accommodated the conveyed object by a preset period.

* * * * *